United States Patent
Guo et al.

(10) Patent No.: US 10,547,043 B2
(45) Date of Patent: Jan. 28, 2020

(54) WELD PATTERNS FOR BATTERY ASSEMBLY JOINTS

(71) Applicant: FORD GLOBAL TECHNOLOGIES, LLC, Dearborn, MI (US)

(72) Inventors: Yunan Guo, Rochester Hills, MI (US); Yongcai Wang, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/652,653

(22) Filed: Jul. 18, 2017

(65) Prior Publication Data

US 2019/0027734 A1 Jan. 24, 2019

(51) Int. Cl.
*H01M 2/30* (2006.01)
*H01M 2/20* (2006.01)

(52) U.S. Cl.
CPC .......... *H01M 2/305* (2013.01); *H01M 2/202* (2013.01); *H01M 2220/20* (2013.01)

(58) Field of Classification Search
CPC .................................. H01M 2/20; H01M 2/30
See application file for complete search history.

(56) References Cited

U.S. PATENT DOCUMENTS

| 8,409,744 B2 | 4/2013 | Ijaz et al. |
| 9,457,743 B2 | 10/2016 | Soleski et al. |
| 9,484,566 B2 | 11/2016 | Lee |
| 2010/0247992 A1* | 9/2010 | Miyata ................. B23K 26/206 429/94 |
| 2010/0248029 A1 | 9/2010 | Butt et al. |
| 2010/0266890 A1* | 10/2010 | Caumont ............... H01G 9/058 429/158 |
| 2011/0081568 A1* | 4/2011 | Kim ...................... H01M 2/206 429/158 |
| 2014/0349148 A1* | 11/2014 | Ikeda ...................... H01M 2/22 429/56 |
| 2017/0028515 A1 | 2/2017 | De Souza |

FOREIGN PATENT DOCUMENTS

| CN | 205723728 U | 11/2016 |
| JP | 2014178130 A1 | 2/2017 |
| WO | 2016/157268 A1 | 10/2016 |

* cited by examiner

*Primary Examiner* — James Lee
(74) *Attorney, Agent, or Firm* — David B. Kelley; Carlson, Gaskey & Olds

(57) ABSTRACT

A battery assembly includes a first battery cell including a first terminal, a bus bar connected to the first terminal, and a first weld bead for securing the bus bar to the first terminal. The first weld bead includes a first end portion extending continuously to a second end portion and configured such that the first end portion faces in a direction toward the second end portion.

19 Claims, 3 Drawing Sheets

WELD PATTERNS FOR BATTERY ASSEMBLY JOINTS

TECHNICAL FIELD

This disclosure relates to battery assemblies for electrified vehicle battery packs. An exemplary battery assembly includes a weld pattern configured to improve stress distributions and increase the strength and life of battery cell terminal/bus bar joints.

BACKGROUND

The desire to reduce automotive fuel consumption and emissions is well documented. Therefore, vehicles are being developed that reduce or completely eliminate reliance on internal combustion engines. Electrified vehicles are currently being developed for this purpose. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage battery pack typically powers the electric machines and other electrical loads of the electrified vehicle. The battery pack includes a plurality of battery cells that store energy. The battery cells must be reliably connected to one another in order to achieve the voltage and power levels necessary for powering these electrical loads. Bus bars are commonly used to connect the battery cells.

SUMMARY

A battery assembly according to an exemplary aspect of the present disclosure includes, among other things, a first battery cell including a first terminal, a bus bar connected to the first terminal, and a first weld bead for securing the bus bar to the first terminal. The first weld bead includes a first end portion extending continuously to a second end portion and configured such that the first end portion faces in a direction toward the second end portion.

In a further non-limiting embodiment of the foregoing battery assembly, the bus bar is connected to a second terminal of a second battery cell with a second weld bead.

In a further non-limiting embodiment of either of the foregoing battery assemblies, the second weld bead includes a first end portion extending continuously to a second end portion and configured such that the first end portion faces in a direction toward the second end portion.

In a further non-limiting embodiment of any of the foregoing battery assemblies, the first terminal is comprised of a first material and the bus bar is comprised of a second, different material.

In a further non-limiting embodiment of any of the foregoing battery assemblies, the first material is copper and the second material is aluminum.

In a further non-limiting embodiment of any of the foregoing battery assemblies, the assembly includes a second weld bead for securing the bus bar to the first terminal.

In a further non-limiting embodiment of any of the foregoing battery assemblies, the second weld bead is positioned adjacent to the first weld bead and faces toward the first weld bead.

In a further non-limiting embodiment of any of the foregoing battery assemblies, the first weld bead and the second weld bead both extend laterally across a portion of a width of the bus bar.

In a further non-limiting embodiment of any of the foregoing battery assemblies, the first weld bead and the second bead both extend longitudinally along a portion of a length of the bus bar.

In a further non-limiting embodiment of any of the foregoing battery assemblies, the first weld bead and the second weld bead establish a Double-C weld pattern.

In a further non-limiting embodiment of any of the foregoing battery assemblies, the first weld bead is generally C-shaped.

In a further non-limiting embodiment of any of the foregoing battery assemblies, the first weld bead extends along a non-linear path.

In a further non-limiting embodiment of any of the foregoing battery assemblies, the non-linear path extends from the first end portion toward a side of the bus bar, and then toward an end of the bus bar, and then toward an opposite side of the bus bar, and then toward an opposite end of the bus bar, and then back toward the first end portion before terminating at the second end portion.

In a further non-limiting embodiment of any of the foregoing battery assemblies, the non-linear path extends from the first end portion toward an end of the bus bar, and then toward a side of the bus bar, and then toward an opposite end of the bus bar, and then toward an opposite side of the bus bar, and then back toward the first end portion before terminating at the second end portion.

In a further non-limiting embodiment of any of the foregoing battery assemblies, the first terminal is either a positive terminal or a negative terminal.

A method according to another exemplary aspect of the present disclosure includes, among other things, welding a bus bar to a first terminal of a battery cell using a weld pattern that includes at least one weld bead extending along a non-linear path.

In a further non-limited embodiment of the foregoing method, welding the bus bar to the terminal includes laser welding the bus bar to the terminal.

In a further non-limiting embodiment of either of the foregoing methods, the weld pattern includes two weld beads that face toward one another.

In a further non-limiting embodiment of any of the foregoing methods, the two weld beads extend laterally across a portion of a width of the bus bar.

In a further non-limiting embodiment of any of the foregoing methods, the two weld beads extend longitudinally across a portion of a length of the bus bar.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details battery assemblies for use within electrified vehicle battery packs. An exemplary battery assembly includes a first battery cell having a first terminal, a bus bar, and a first weld bead for securing the bus bar to the first terminal. The weld bead includes a first end portion extending continuously to a second end portion and configured such that the first end portion faces in a direction toward the second end portion. The first weld bead may be part of a weld pattern configured to improve stress distributions and increase strength of battery cell terminal/bus bar joints. These and other features of this disclosure are discussed in greater detail in the following paragraphs of this detailed description.

Figure 1:
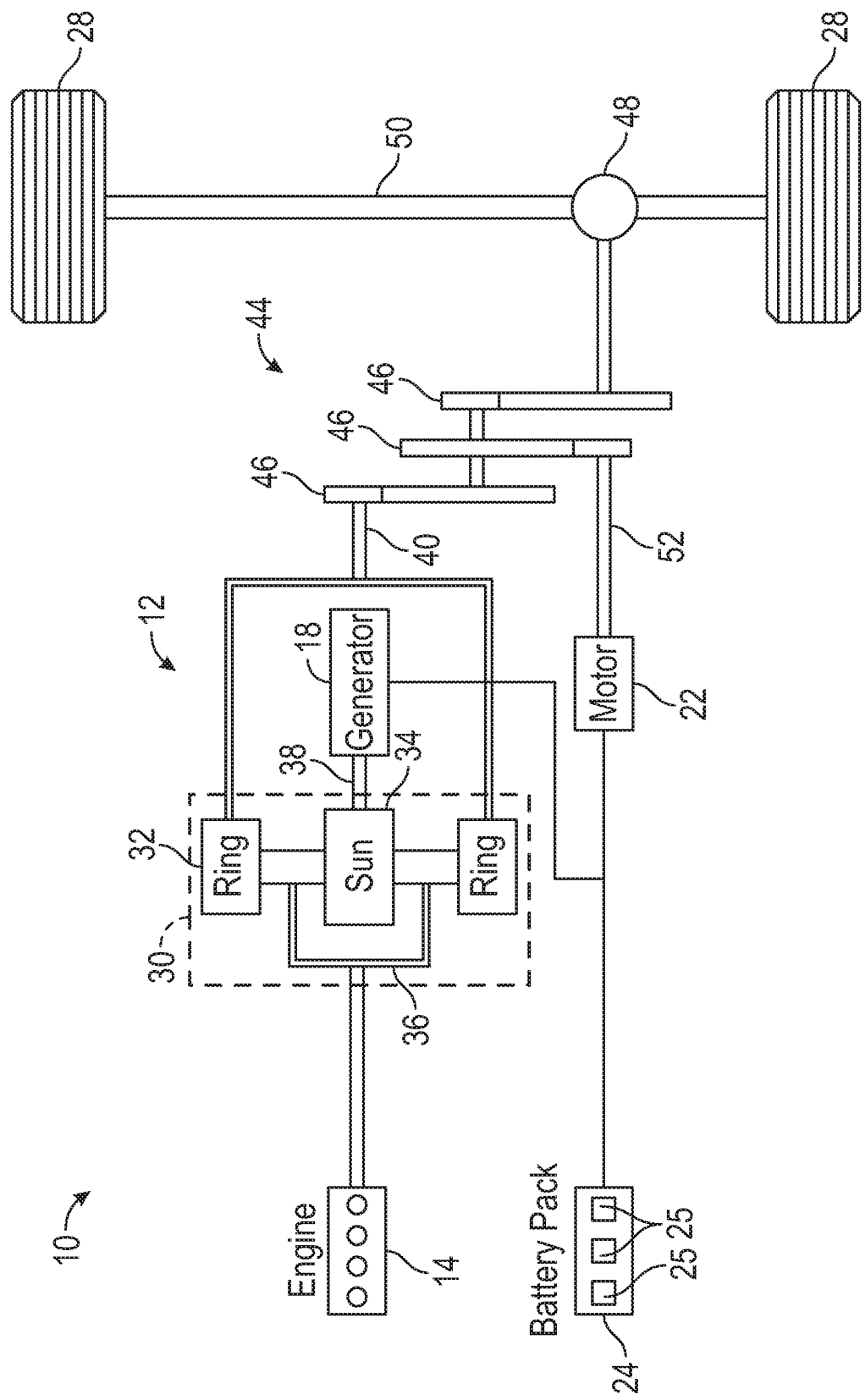
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's), fuel cell vehicles, etc.

In a non-limiting embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18, and/or other electrical loads of the electrified vehicle 12. Other types of energy storage devices and/or output devices could also be used to electrically power the electrified vehicle 12.

In a non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
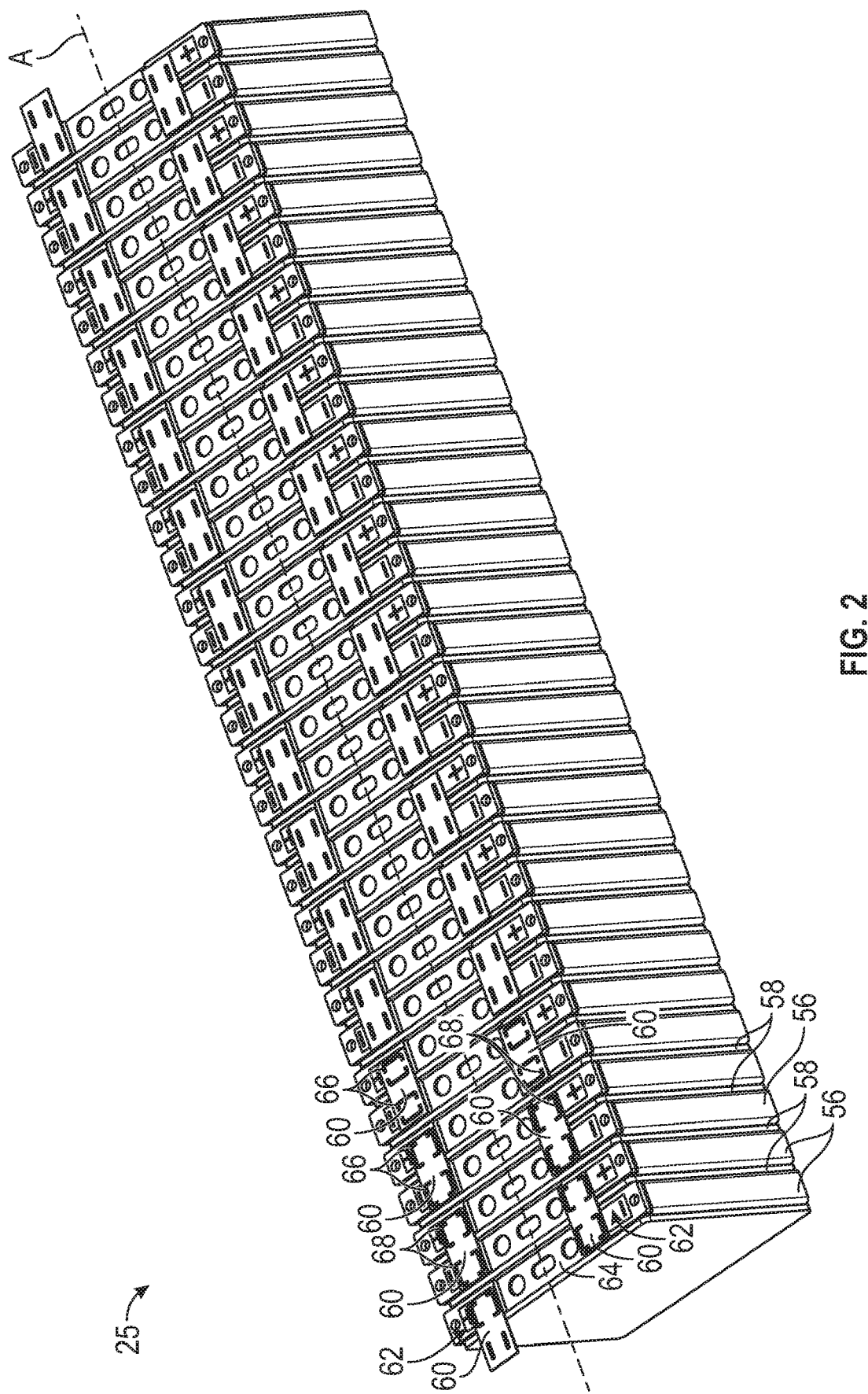
FIG. 2 illustrates a battery assembly of an electrified vehicle.

FIG. 2 illustrates a battery assembly 25 that can be employed within an electrified vehicle. For example, the battery assembly 25 could be a component of the battery pack 24 of the electrified vehicle 12 of FIG. 1. The battery assembly 25 includes a plurality of battery cells 56 that store energy for powering various electrical loads of the electrified vehicle 12. Although a specific number of battery cells are depicted in FIG. 2, the battery assembly 25 could employ a greater or fewer number of cells within the scope of this disclosure. In other words, this disclosure is not limited to the specific configuration shown in FIG. 2.

The battery cells 56 may be stacked side-by-side along a longitudinal axis A to construct a grouping of battery cells 56, sometimes referred to as a "cell stack." In an embodiment, the battery cells 56 are prismatic, lithium-ion cells. However, battery cells having other geometries (cylindrical, pouch, etc.) and/or other chemistries (nickel-metal hydride, lead-acid, etc.) could alternatively be utilized within the scope of this disclosure.

A battery cell spacer 58 may be positioned between each adjacent battery cells 56 of the cell stack of the battery assembly 25. For example, a plurality of battery cells 56 and a plurality of battery cell spacers 58 may be arranged side-by-side in an alternating fashion to construct the battery assembly 25. The spacers 58 may also be referred to as separators or dividers. In an embodiment, the spacers 58 include thermally resistant and electrically isolating plastics and/or foams that exhibit relatively high thermal insulating capabilities.

The battery cells 56, along with any support structures (e.g., array frames, spacers, rails, walls, plates, bindings, etc.), may collectively be referred to as the battery assembly 25. The battery pack 24 may include one or more of the battery assemblies 25.

A pair of terminals 62 extend outwardly from a top surface 64 of each battery cell 56. In an embodiment, the terminals 62 are disposed near opposite ends of the top surface 64. One of the terminals 62 is a positive terminal (designated by the symbol "+") and the other terminal 62 is a negative terminal (designated by the signal "−"). The battery cells 56 may be arranged such that each terminal 62 is disposed adjacent to a terminal of an adjacent battery cell that includes an opposite polarity. Therefore, the positive (+) terminals 62 are positioned adjacent to negative (−) terminals 62 along the entire cell stack at both ends of the top surfaces 64.

The battery assembly 25 may additionally include a plurality of bus bars 60 for electrically connecting battery cells 56 of the battery assembly 25. Each bus bar 60 connects to a positive (+) terminal 62 on one battery cell 56 and a negative (−) terminal 62 on an adjacent battery cell 56. In an embodiment, the terminals 62 are made of a first material and the bus bars 60 are made of a second, different material. For example, the terminals 62 may be copper terminals and the bus bars 60 may be aluminum bus bars. In another embodiment, the positive (+) terminals 62 are aluminum terminals, the negative (−) terminals 62 are copper terminals, and the bus bars 60 are aluminum bus bars. Other materials are also contemplated within the scope of this disclosure.

The bus bars 60 may be secured to the terminals 62 using one or more weld beads 68. In an embodiment, the bus bars 60 are laser welded to the terminals 62. However, other welding operations are also contemplated within the scope of this disclosure.

Static and fatigue strength experiments and computer-aided engineering (CAE) simulations have shown that high stress areas occur at the start and end points of the weld beads 68. To address this issue, the bus bars 60 may be connected to the terminals 62 using unique weld patterns 66 made up of one or more contoured weld beads 68. The unique weld patterns 66 shown and described herein are designed to improve stress distributions and increase strength of battery cell terminal 62/bus bar 60 joints. Various exemplary weld patterns for securing the bus bars 60 to the terminals 62 are described below with reference to FIGS. 3-6.

Figure 3:
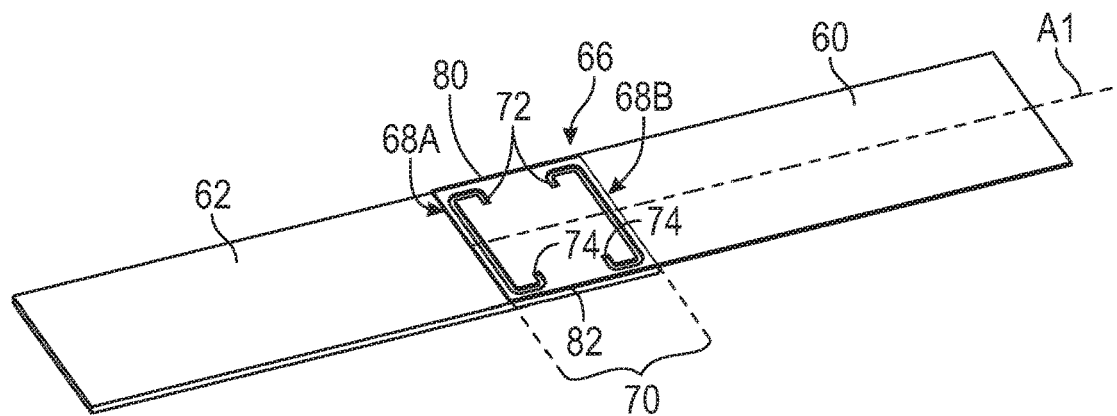
FIG. 3 illustrates a weld pattern for welding a bus bar to a battery cell terminal according to a first embodiment of this disclosure.

FIG. 3 illustrates a first exemplary weld pattern 66 for securing a bus bar 60 to a terminal 62. In an embodiment, the weld pattern 66 includes a first weld bead 68A and a second weld bead 68B. The weld beads 68A, 68B may be positioned near an overlap 70 between the bus bar 60 and the terminal 62. In an embodiment, a portion of the bus bar 60 is placed over top of a portion of the terminal 62 to establish the overlap 70.

In an embodiment, each weld bead 68A, 68B is formed using a laser welding technique by welding at the bus bar 60 side of the joint. Laser welding techniques only require access at one side of the joint in order to create the weld pattern 66. However, other welding techniques could alternatively be used to create the weld pattern 66.

The weld pattern 66 of the embodiment of FIG. 3 may be referred to as a Double-C weld pattern. In such a pattern, the first weld bead 68A and the second weld bead 68B are both generally C-shaped and are positioned in parallel to face toward one another. In an embodiment, the first weld bead 68A and the second weld bead 68B are disposed in a lateral configuration in which the weld beads 68A, 68B are arranged to predominately extend transverse to a longitudinal axis A1 of the bus bar 60. The weld beads 68A, 68B extend across a portion of the width of the bus bar 60 in the lateral configuration.

Each weld bead 68A, 68B may include a first end portion 72 that extends continuously along a non-linear path to a second end portion 74. For example, the non-linear path may establish the C-shape of each weld bead 68A, 68B. However, other shapes are also contemplated within the scope of this disclosure. The first end portion 72 and the second end portion 74 extend in a direction toward one another. This design effectively positions the start and end points of the weld beads 68A, 68B at lower stress zones of the bus bar 60/terminal 62 joint.

In another embodiment, each weld bead 68A, 68B may be formed by moving a welding tool from the first end portion 72 toward a side 80 of the bus bar 60, then in a direction away from the other weld bead 68A, 68B, then in a direction toward an opposite side 82 of the bus bar 60, then in a direction back toward the other weld bead 68A, 68B, and then in a direction toward the first end portion 72 to establish the second end portion 74. This is but one example of how the weld beads 68A, 68B could be formed. This disclosure is not intended to be limited to this exact weld bead configuration.

Figure 4:
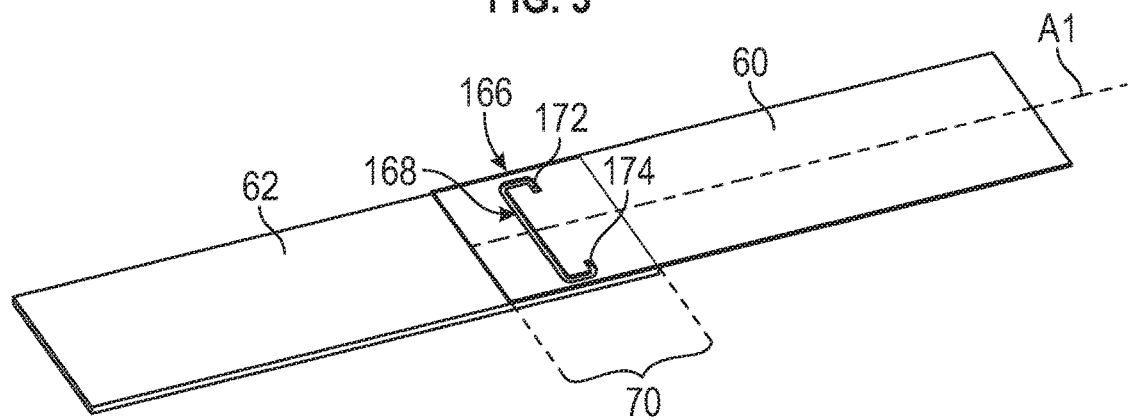
FIG. 4 illustrates a weld pattern according to a second embodiment of this disclosure.

FIG. 4 illustrates a second exemplary weld pattern 166 for securing a bus bar 60 to a terminal 62. In this embodiment, the weld pattern 166 includes a single weld bead 168. The weld bead 168 may be positioned near an overlap 70 between the bus bar 60 and the terminal 62.

The weld pattern 166 of the embodiment of FIG. 4 may be referred to as a Single-C weld pattern. In such a pattern, the weld bead 168 is generally C-shaped. In an embodiment, the weld bead 168 is disposed in a lateral configuration in which it predominately extends transverse to the longitudinal axis A1 of the bus bar 60. The weld bead 168 extends across a portion of the width of the bus bar 60 in this lateral configuration.

The weld bead 168 include a first end portion 172 that extends continuously along a non-linear path to a second end portion 174. The non-linear path may establish the C-shape of the weld bead 168. The first end portion 172 and the second end portion 174 extend toward one another. This design also effectively positions the start and end points of the weld bead 168 at lower stress zones of the bus bar 60/terminal 62 joint.

Figure 5:
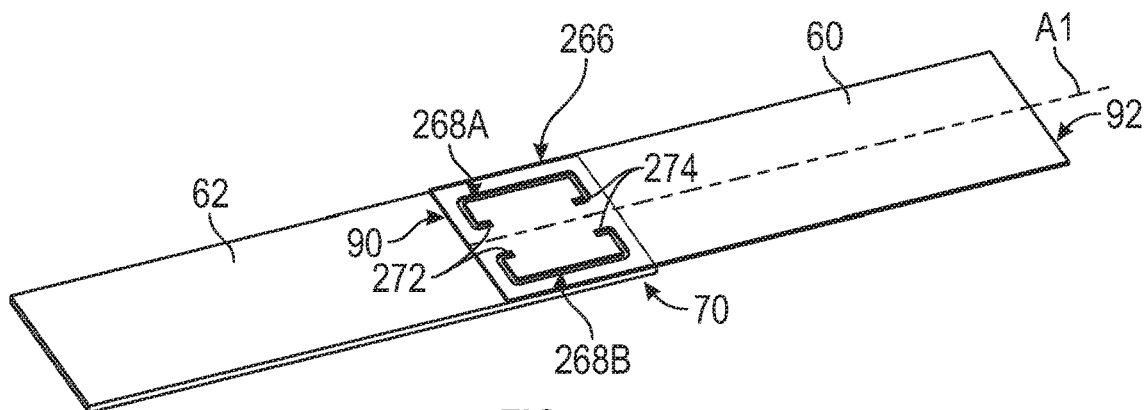
FIG. 5 illustrates a weld pattern according to a third embodiment of this disclosure.

FIG. 5 illustrates another exemplary weld pattern 266 for securing a bus bar 60 to a terminal 62. In an embodiment, the weld pattern 266 includes a first weld bead 268A and a second weld bead 268B. The weld beads 268A, 268B may be positioned near an overlap 70 between the bus bar 60 and the terminal 62.

The weld pattern 266 of the embodiment of FIG. 5 is another exemplary Double-C weld pattern. In such a pattern, the first weld bead 268A and the second weld bead 268B are both generally C-shaped and are positioned in parallel to face toward one another. In an embodiment, the first weld bead 268A and the second weld bead 268B are disposed in a longitudinal configuration in which the weld beads 268A, 268B are arranged to predominately extend in parallel with the longitudinal axis A1 of the bus bar 60. The weld beads 268A, 268B thus extend across a portion of the length of the bus bar 60 in this longitudinal configuration.

Each weld bead 268A, 268B may include a first end portion 272 that extends continuously along a non-linear path to a second end portion 274. For example, the non-linear path may establish the C-shape of each weld bead 268A, 268B. Other shapes are also contemplated within the scope of this disclosure. The first end portion 272 and the second end portion 274 extend in a direction toward one another. This design also effectively positions the start and end points of the weld beads 268A, 268B at lower stress zones of the bus bar 60/terminal 62 joint.

In another embodiment, each weld bead 268A, 268B may be formed by moving a welding tool from the first end portion 272 toward an end 90 of the bus bar 60, then in a direction away from the other weld bead 268A, 268B, then in a direction toward an opposite end 92 of the bus bar 60, then in a direction toward the other weld bead 268A, 268B, and then in a direction back toward the first end portion 272 before terminating at the second end portion 274. This is but one example of how the weld beads 268A, 268B could be formed, and this disclosure is not intended to be limited to this exact weld bead configuration.

Figure 6:
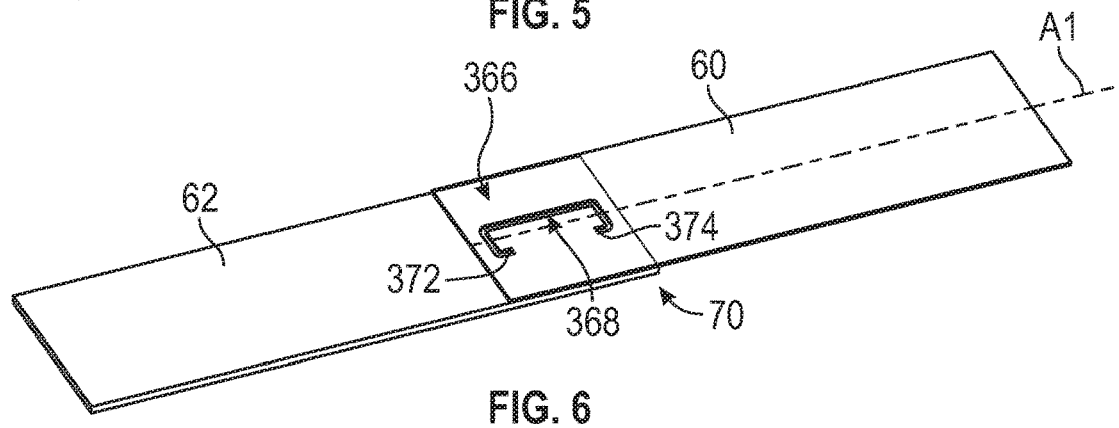
FIG. 6 illustrates a weld pattern according to a fourth embodiment of this disclosure.

FIG. 6 illustrates yet another exemplary weld pattern 366 for securing a bus bar 60 to a terminal 62. In this embodiment, the weld pattern 366 includes a single weld bead 368. The weld bead 368 may be positioned near an overlap 70 between the bus bar 60 and the terminal 62.

The weld pattern 366 of the embodiment of FIG. 6 may be referred to as a Single-C weld pattern. In such a pattern, the weld bead 368 is generally C-shaped. In an embodiment, the weld bead 368 is disposed in a longitudinal configuration in which it predominately extends in parallel with the longitudinal axis A1 of the bus bar 60. The weld bead 368 extends across a portion of the length of the bus bar 60 in the longitudinal configuration.

The weld bead 368 include a first end portion 372 that extends continuously along a non-linear path to a second end portion 374. The non-linear path may establish the C-shape of the weld bead 368. The first end portion 372 and the second end portion 374 extend toward one another. This design effectively positions the start and end points of the weld bead 368 at lower stress zones of the bus bar 60/terminal 62 joint.

The unique weld patterns of this disclosure effectively position the start and end points of each weld bead at lower stress areas of the bus bar/terminal joints. The weld patterns optimize stress distributions to render more robust joints that exhibit higher static strengths. The exemplary weld patterns further increase the fatigue life of the joints, thereby improving joint quality.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery assembly, comprising:
    a first battery cell including a first terminal;
    a bus bar connected to the first terminal; and
    a first weld bead for securing the bus bar to the first terminal, wherein the first weld bead includes a first end portion extending continuously to a second end portion and configured such that a tip of the first end portion faces in a direction toward a tip of the second end portion,
    wherein the first weld bead extends along a non-linear path,
    wherein the non-linear path extends from the first end portion toward a side of the bus bar, and then toward an end of the bus bar, and then toward an opposite side of the bus bar, and then toward an opposite end of the bus bar, and then back toward the first end portion before terminating at the second end portion.

2. The battery assembly as recited in claim 1, wherein the bus bar is connected to a second terminal of a second battery cell with a second weld bead.

3. The battery assembly as recited in claim 2, wherein the second weld bead includes a first end portion extending continuously to a second end portion and configured such that the first end portion of the second weld bead faces in a direction toward the second end portion of the second weld bead.

4. The battery assembly as recited in claim 1, wherein the first terminal is comprised of a first material and the bus bar is comprised of a second, different material.

5. The battery assembly as recited in claim 4, wherein the first material is copper and the second material is aluminum.

6. The battery assembly as recited in claim 1, comprising a second weld bead for securing the bus bar to the first terminal.

7. The battery assembly as recited in claim 6, wherein the second weld bead is positioned adjacent to the first weld bead and faces toward the first weld bead.

8. The battery assembly as recited in claim 6, wherein the first weld bead and the second weld bead both extend laterally across a portion of a width of the bus bar.

9. The battery assembly as recited in claim 6, wherein the first weld bead and the second bead both extend longitudinally along a portion of a length of the bus bar.

10. The battery assembly as recited in claim 6, wherein the first weld bead and the second weld bead establish a Double-C weld pattern.

11. The battery assembly as recited in claim 1, wherein the first weld bead is generally C-shaped.

12. The battery assembly as recited in claim 1, wherein the first terminal is either a positive terminal or a negative terminal.

13. The battery assembly as recited in claim 1, wherein the bus bar is secured directly to the first terminal by the first weld bead, and the first weld bead extends continuously and uninterrupted from the first end portion to the second end portion.

14. The battery assembly as recited in claim 1, wherein the bus bar is positioned over a portion of the first terminal to establish an overlap, and the first weld bead is formed within the overlap.

15. The battery assembly as recited in claim 1, wherein the first terminal is mounted to a top surface of the first battery cell, and comprising a second terminal mounted to the top surface of the first battery cell.

16. The battery assembly as recited in claim 1, wherein the first terminal of the first battery cell is comprised of aluminum, a second terminal of the first battery cell is comprised of copper, and the bus bar is comprised of aluminum.

17. The battery assembly as recited in claim 1, wherein the tip of the first end portion extends in a direction toward the tip of the second end portion, and the tip of the second end portion extends in a direction toward the tip of the first end portion.

18. A battery assembly, comprising:
a first battery cell including a first terminal;
a bus bar connected to the first terminal; and
a first weld bead for securing the bus bar to the first terminal, wherein the first weld bead includes a first end portion extending continuously to a second end portion and configured such that a tip of the first end portion faces in a direction toward a tip of the second end portion,
wherein the first weld bead extends along a non-linear path,
wherein the non-linear path extends from the first end portion toward an end of the bus bar, and then toward a side of the bus bar, and then toward an opposite end of the bus bar, and then toward an opposite side of the bus bar, and then back toward the first end portion before terminating at the second end portion.

19. A battery assembly, comprising:
a first battery cell including a first terminal;
a bus bar connected to the first terminal; and
a first weld bead for securing the bus bar to the first terminal, wherein the first weld bead includes a first end portion extending continuously to a second end portion and configured such that a tip of the first end portion faces in a direction toward a tip of the second end portion,
wherein the first weld bead is generally C-shaped,
wherein the first weld bead includes a first weld bead portion that is perpendicular to the first end portion, a second weld bead portion that is perpendicular to the first weld bead portion, and a third weld bead portion that is perpendicular to the second weld bead portion and to the second end portion, wherein, together, the first end portion, the first weld bead portion, the second weld bead portion, the third weld bead portion, and the second end portion establish the C-shape of the first weld bead.

* * * * *